METHOD FOR CONTROLLED AGING OF THIN MAGNETIC FILMS BY MEANS OF AN EASY AXIS ANNEALING TREATMENT
Filed Jan. 13, 1965

INVENTORS J. T. H. CHANG
U. F. GIANOLA
M. W. SAGAL
BY [signature]
ATTORNEY

United States Patent Office 3,374,113
Patented Mar. 19, 1968

3,374,113

METHOD FOR CONTROLLED AGING OF THIN MAGNETIC FILMS BY MEANS OF AN EASY AXIS ANNEALING TREATMENT

James T. H. Chang, New Providence, Umberto F. Gianola, Florham Park, and Matthew W. Sagal, Summit, N.J., assignors to Bell Telephone Laboratories, Incorporated, New York, N.Y., a corporation of New York Filed Jan. 13, 1965, Ser. No. 425,279
2 Claims. (Cl. 117—227)

ABSTRACT OF THE DISCLOSURE

The disclosure describes a technique for controlled aging of magnetic films, in particular, films of iron-nickel alloys. The technique involves an easy axis treatment at moderately raised temperatures. The easy axis anisotropy is thereby preserved during the accelerated aging period and the resulting film is stable.

This invention relates to the processing of magnetic thin films to improve the stability of their magnetic properties.

A periodic check of dispersion and skew properties of cylindrical film memory wire having close to zero magnetostriction composition measured by the technique described by H. S. Belson in Proceedings of 1963 Intermag Conference, page 12–4–1, shows an initial rapid degradation of these parameters followed by a slower change to equilibrium values. This degradation occurs even at room temperature. Similar degradation effects are encountered in planar evaporated films. This problem of changing magnetic properties in films as an aging process cannot be tolerated in applications requiring close tolerances on the magnetic performance of the film.

It has now been found that the change in magnetic properties ultimately reaches an equilibrium. It has also been demonstrated that the changes can be accelerated under appropriate conditions so that the aging process is essentially completed in a period of a few hours. If this change is controlled by a properly oriented field the original magnetic properties of the film can be preserved during the accelerated aging process. The magnetic characteristics of the film are then stabilized for long periods of use and against variations accelerated by warm environments.

These aging effects are expected in various ferromagnetic alloys with an induced easy axis. However this invention is particularly directed to nickel-iron alloys, and nickel-iron-cobalt alloys having induced uniaxially magnetic anisotropy. Certain other additions are sometimes made to the alloy to improve specific characteristics of the material. Of significant current interest are nickel-iron alloys having zero or close to zero magnetostriction. These alloys contain approximately 81 percent nickel.

A particularly useful form of magnetic film is an electroplated cylindrical film which is used in magnetic memory devices as will be described hereinafter. These films may be deposited according to known prior art techniques such as those described in United States Patents Nos. 3,027,309, issued Mar. 27, 1962, and 3,047,475, issued July 31, 1962. Methods for evaporating thin magnetic film are described in M. S. Blois, Jr., J. Appl. Phys., 26, 975 (1955). Sputtered films are treated by M. H. Francombe and A. J. Noreika, J. Appl. Phys., 32, 97 S (1961). This invention is applicable to all such deposited nickel-iron thin films.

These and other aspects of the invention will be more fully treated in the following detailed description. In the drawing.

Figure 1:
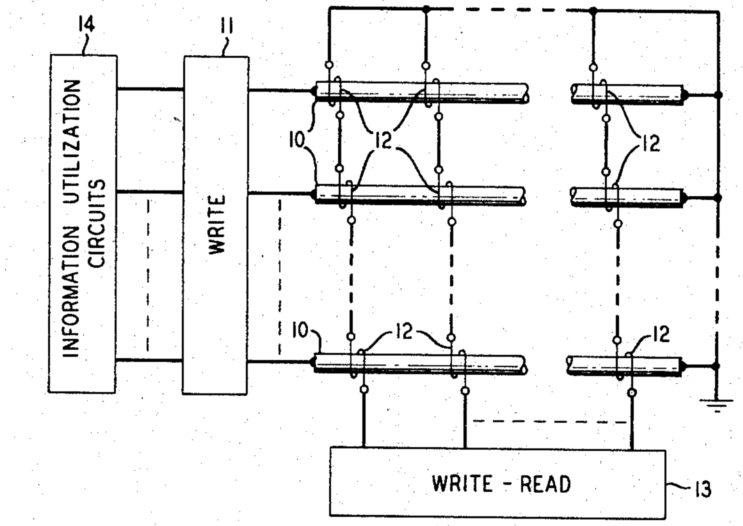
FIG. 1 is a schematic representation of a memory array relying on thin film magnetic elements such as those produced in accordance with the invention.

In FIG. 1 a plurality of plated cylindrical magnetic films 10 are shown in a memory array. This memory array is organized and operated as described in United States Patent No. 3,069,661, issued Dec. 18, 1962. The operation utilizes magnetic films with axial easy axis. Another commonly used arrangement utilizes those with a circumferential easy axis. Such an arrangement is well known in the art and magnetic wire processed for devices intended to operate in this manner is also within the scope of this invention and in some cases is a preferred embodiment. Consequently, the following description will be directed to the circumferential mode of operation. The films can be prepared by electroplating a thickness, generally 10,000 A. of nickel-iron alloy onto a copper or a beryllium copper wire substrate. The wire is typically .003 inch to .016 inch in diameter. The wire is electroplated in an aqueous bath of mixed iron and nickel salts according to known procedures such as those described in the patents referred to above. While nickel-iron alloys of several compositions have useful magnetic properties the 80 percent to 81 percent nickel alloys are preferred since they exhibit low magnetostriction and consequently their magnetic characteristics will not vary as the result of strains introduced into the film during processing and fabrication of the memory arrays.

The magnetic conductors 10 are shown connected at one end to ground and at the other end to suitable x-coordinate write pulse circuits illustrated diagramatically at 11. A series of solenoids 12 are arranged orthogonal to, and inductively coupled with the magnetic conductors. The solenoids 12 are shown connected at one end to ground and at the other end to suitable y-coordinate write-read pulse circuits indicated by the box 13. Also connected to the magnetic conductors are information utilization circuits 14 adapted to receive the output signals from an interrogated magnetic conductor.

This memory array is adapted for storage of binary information in a word-organized arrangement. Coordinate write-read and quadrature read-out are used as conventionally known in the art. Briefly described the operation is as follows:

The magnetic conductors 10 have an induced easy direction as symbolized by the arrows. A hard direction current pulse is applied to the desired word by current source 13. Simultaneously a tipping current is applied from source 11 to the desired address and the polarity of the tipping current dictates whether the magnetization state returns to its original direction or is tipped over into the other quadrant so that the flux is reversed. The flux state in the magnetic conductor 10 indicates the binary value stored and is read by merely rotating the flux away from the easy axis by a hard direction read-out field applied by current source 13 and sensing the polarity of the induced voltage with utilization circuits 14 as the flux is rotated into the hard direction. For nondestructive read-out the read-out pulse is made insufficient to induce a 90° hard direction flux so that the flux is made to remain in one quadrant or the other according to the information stored.

The magnetic film 10 is deposited on a conductive wire in the presence of a magnetic field usually of the order of 10 oersteds or larger and oriented to induce an easy axis in the desired direction. As discussed above this anisotropy deteriorates during use as a consequence of aging.

According to this invention the aging process is accelerated essentially to completion under an easy direction field before the film is put into use. Thereafter the magnetic properties of the film exhibit a stability which is characteristically superior to films manufactured without the stabilizing treatment. This is achieved by subjecting the film, which already exhibits a magnetic anisotropy field typically of the order of 2 to 4 oersteds, to an annealing operation in the presence of an easy direction field. As indicated previously, the easy direction field serves to insure that any realignment of magnetic anisotropy is in the proper direction so as to preserve the anisotropy already present.

The annealing time may vary significantly according to the temperature of anneal. The minimum useful anneal temperature at 100° C. which requires an anneal time of the order of 40 hours. At lower temperatures the stabilizing process becomes too slow to be practical for a commercial process. As the annealing temperature increases the time required for annealing becomes shorter. The anneal time corresponding to 120° C. is 20 hours. At 300° C. it is approximately 2 minutes. Higher temperatures can be used up to a maximum of 550° C. prescribed by the Curie temperature of the film.

The useful aspects of this invention were demonstrated by comparative aging studies on magnetic films produced by prior art techniques and on identical films which had been subsequently stabilized by heat treatment according to this invention.

Figure 2:
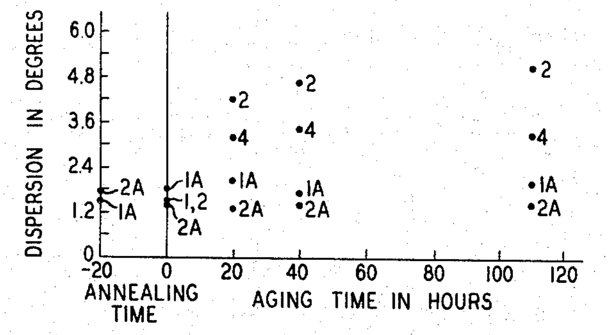
FIG. 2 is a graphic representation, plotting dispersion versus aging time, of the results of accelerated aging studies on films with and without the treatment of this invention.
Figure 3:
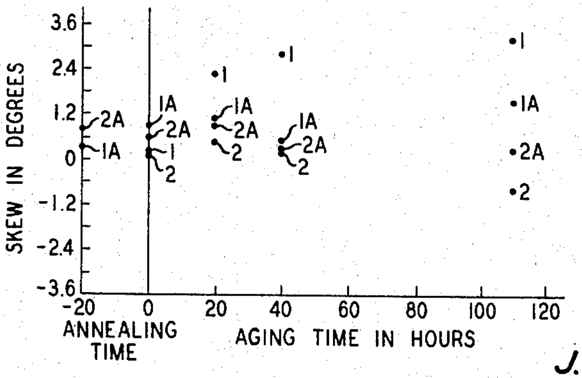
FIG. 3 is a plot similar to that of FIG. 2 plotting the results of skew versus aging.

The results are presented in FIGS. 2 and 3. The particular samples used to obtain these results were heat treated for approximately 20 hours at 120° C. in a D.C. easy direction field of approximately 9 oersteds. The films were electroplated onto .005 inch diameter wires to a thickness of 10,000 A. The film composition was approximately 81 percent nickel–19 percent iron. The anistropy field $H_k$ of the electroplated films was 3 oersteds and the dispersion was less than 2°. Although these results were obtained at the anneal conditions given, longer anneal times at lower temperatures and shorter treatments at higher temperatures within the limits prescribed above are equally useful. The easy direction field is preferably at least 6 oersteds.

FIG. 2 gives the results of comparative aging studies on four samples. The property of interest is the dispersion which was measured by the technique described in Proceedings 1963 Intermag Conference, p, 12–4–1, briefly described as follows:

A triangular or a sinusoidal low frequency (40 c.p.s.) current is sent down the wire to provide a periodic easy direction field, $H_L$, whose amplitude is also displayed on the horizontal scale of an oscilloscope. A high frequency hard direction pulse field greater than the effective $H_k$ is provided by a 1 inch long solenoid. The output signal due to the hard direction field is displayed on the vertical scale of a cathode ray oscilloscope. The dispersion is characterized by defining an angle $\alpha_{90}$ as the half angle centered around the easy axis which contains 90 percent of the flux within it.

The signal amplitude at any point along the horizontal axis of the oscilloscope measures the total flux switched during writing. When this amplitude is 90 percent of the maximum, the easy direction field at this point fails to switch 5 percent of the flux.

An increment of flux whose real easy axis is at an angle $\alpha$ from the mean easy direction will be switched if $\vec{H}_L + \vec{H}_L = \vec{H}_k$, where $H_k$ is along the direction normal to this real easy axis; thus switching will occur if $$\sin \alpha = \frac{H_L}{H_k}$$

When $H_L$ is such that 5 percent of the flux is not switched, then 45 percent of the flux lies within a half angle given by $$\alpha_{90} = \sin^{-1} \frac{H_L}{H_k}$$

For 5 mil wire with $H_k = 3$ oe., $\alpha_{90} \cong 0.6°$ for $H_L = 0.03$ oe. $\equiv$ 1 ma. wire current.

The dispersion in degrees is plotted versus aging time in hours in FIG. 2. Aging was done at 55° C., considered the upper limit of the temperature range typically required for memory operation. The aging was accompanied by a pulsed hard direction field applied to each sample to simulate actual operating conditions. Samples 1 and 1A were subjected to a high hard direction pulse field alone (6 oersted, 0.4$\mu$ wide $5 \times 10^5$ pulses/sec.). Samples 2 and 2A were exposed to a low hard pulse field alone (2 oersteds, 0.4$\mu$ wide $5 \times 10^5$ pulses/sec.).

Measurements were made on the annealed Samples 1A and 2A prior to annealing (−20 hours) and on all samples at the start of the aging study and at 20, 40 and 110 hours.

It is seen that for the unannealed samples, 1 and 2, the dispersion degraded badly over the aging period. These samples show that while the magnetic characteristics of memory elements may be found to be initially acceptable, after a few weeks of use the equipment into which they are built may begin to malfunction. On the other hand, the samples which have been processed in accordance with this invention are extremely stable and studies indicate that the dispersion will continue to be stable over protracted periods of use.

FIG. 3 compares the skew of the easy axis for annealed and unannealed wires in a manner similar to that of FIG. 2. The test conditions were the same as those used to obtain the data of FIG. 2.

The parameter, skew, is defined as the deviation of the mean easy direction from the circumferential direction. The condition that defines the zero crossing is also $\vec{H}_L + \vec{H}_L = \vec{H}_k$, where $H_k$ is along the mean head direction. Therefore $\theta_s$, the skew angle, is $$\theta_s = \sin^{-1} \frac{H_L}{H_k}$$

where $H_L$ is measured at the zero crossing of the envelope of the oscilloscope display. As before, assuming $H_k = 3$ oe., $\theta_s = 0.6°$ for $H_L = 1$ ma.

The results are similar in all respects to those reported in FIG. 2.

Since the degradation of these magnetic properties is characteristic of iron-nickel thin film in general the same qualitative results will be obtained regardless of the geometry of the film, the method of fabrication of the film or the precise percentage of the nickel-iron constituents. The processing technique to which this invention is directed is applicable to iron-nickel and iron-nickle-cobalt magnetically anisotropic thin deposited films having a thickness of less than 50,000 A. which initially possess a dispersion $\alpha_{90}$ of less than 5°. In most instances films treated to obtain the advantages of this invention have a dispersion of 2° or less.

Various other modifications and extension of this invention will become apparent to those skilled in the art. All such variations and deviations which basically rely on the teachings through which this invention has advanced the art are properly considered within the spirit and scope of this invention.

What is claimed is:

1. A process for preparing thin magnetic films consisting essentially of depositing a film consisting of an iron-nickel alloy onto a conductive substrate in the presence of a magnetic field whereby an easy axis induced anisotropy with an $\alpha_{90}$ dispersion of less than 5° is produced in the direction of the field, and annealing the film in an easy-axis field of at least 6 oersteds for a period of 2 minutes to 40 hours at a temperature of 100° to 300° C., the shorter anneal times corresponding to the higher temperatures.

2. The process of claim 1 wherein the film has a composition of approximately 80 to 81 percent nickel and 19 to 20 percent iron.

References Cited

UNITED STATES PATENTS

| | | | |
|---|---|---|---|
| 3,039,891 | 6/1962 | Mitchell | 148—108 |
| 3,047,423 | 7/1962 | Eggenberger et al. | 148—108 |
| 3,113,055 | 12/1963 | Schindler et al. | 148—103 |

HYLAND BIZOT, *Primary Examiner.*

DAVID L. RECK, *Examiner.*

P. WEINSTEIN, N. F. MARKVA, *Assistant Examiners.*